(12) United States Patent
Kazaoka

(10) Patent No.: US 8,454,214 B2
(45) Date of Patent: Jun. 4, 2013

(54) VEHICULAR LAMP LED-LIT CURVED LIGHT GUIDE LENS

(75) Inventor: Shigehiko Kazaoka, Shizuoka (JP)

(73) Assignee: Koito Manufacturing Co., Ltd., Minato-ku, Tokyo (JP)

(*) Notice: Subject to any disclaimer, the term of this patent is extended or adjusted under 35 U.S.C. 154(b) by 396 days.

(21) Appl. No.: 12/791,921

(22) Filed: Jun. 2, 2010

(65) Prior Publication Data

US 2010/0309677 A1   Dec. 9, 2010

(30) Foreign Application Priority Data

Jun. 5, 2009   (JP) .................................. 2009-136147

(51) Int. Cl.
*F21V 9/00*   (2006.01)

(52) U.S. Cl.
USPC ........... 362/511; 362/545; 362/626; 362/628; 362/249.02

(58) Field of Classification Search
USPC ................. 362/612, 625, 626, 628, 555, 511, 362/540, 543, 544, 545, 249.02, 249.06, 362/249.14
See application file for complete search history.

(56) References Cited

U.S. PATENT DOCUMENTS

| | | | | |
|---|---|---|---|---|
| 5,136,480 | A * | 8/1992 | Pristash et al. | 362/618 |
| 6,299,334 | B1 * | 10/2001 | Schwanz et al. | 362/511 |
| 6,769,798 | B2 * | 8/2004 | Mishimagi | 362/522 |
| 6,863,414 | B2 * | 3/2005 | Ho | 362/603 |
| 7,255,464 | B2 * | 8/2007 | Rodriguez Barros et al. | 362/494 |
| 7,334,923 | B2 * | 2/2008 | Tanaka et al. | 362/494 |
| 7,357,549 | B2 * | 4/2008 | Gunther | 362/551 |
| 7,478,942 | B2 * | 1/2009 | Kim et al. | 362/620 |
| 7,699,511 | B2 * | 4/2010 | Kawaji et al. | 362/494 |
| 2005/0270802 | A1 * | 12/2005 | Hsu et al. | 362/626 |
| 2006/0193144 | A1 * | 8/2006 | Braeutigam et al. | 362/493 |
| 2008/0130319 | A1 * | 6/2008 | Hsung et al. | 362/626 |
| 2008/0232127 | A1 * | 9/2008 | Futami | 362/511 |

FOREIGN PATENT DOCUMENTS

JP   2006-014309   4/2006

* cited by examiner

*Primary Examiner* — Ismael Negron
(74) *Attorney, Agent, or Firm* — Fish & Richardson P.C.

(57) ABSTRACT

An LED light source is mounted to a base end of a light guide lens including a distal end curving toward the rear of a vehicle and a functional light distribution portion including light diffusion steps, so that light from the LED light source is diffused toward a side of the vehicle. A design light distribution portion is provided between the LED light source and the functional light distribution portion, having a linear optical step on a rear surface of the light guide lens so as to extend in a longitudinal direction of the lens.

11 Claims, 8 Drawing Sheets

VEHICULAR LAMP LED-LIT CURVED LIGHT GUIDE LENS

CROSS REFERENCE TO RELATED APPLICATION

This application claims the benefit of priority from Japanese application 2009-136147, filed on Jun. 5, 2009. The contents of that application are incorporated herein by reference.

TECHNICAL FIELD

The present disclosure relates to a vehicular lamp in which a base end of a light guide lens curving toward the rear of the vehicle is provided with an LED light source and a distal end of the light guide lens is formed with a functional light distribution portion facing sideward of the vehicle.

BACKGROUND

A side turn signal lamp mounted on a side mirror of an automobile is known. For example, in a side turn signal lamp 51 shown in FIG. 10, a light guide lens 53 is provided on a front surface side of a mirror housing 52, and a base end of the light guide lens 53 is provided with an LED light source 54. A distal end of the light guide lens 53 curves toward the rear of the vehicle, and a curved portion is formed with a functional light distribution portion 56 including a plurality of steps 55. The steps 55 diffuse light from the LED light source 54 sideward of the vehicle to form a light distribution pattern that conforms to laws and regulations.

Japanese Patent Application Laid-Open (Kokai) No. 2006-114309 (JP 2006-114309) proposes art for a side turn signal lamp having a curved shape similar to that in FIG. 10. In the side turn signal lamp, a reflective wall is provided rearward of a light guide lens to reflect light leaking from the lens in front of the vehicle, thereby increasing an amount of luminance at the front surface of the light guide lens. U.S. Patent Application No. 2006/193144 (US2006/193144) proposes art for a side flash lamp provided with a front cover that covers a light guide lens. In the side flash lamp, a number of steps are arranged at narrow intervals on both a front surface and a rear surface of the bar-shaped light guide lens in a longitudinal direction of the lens, so that the entire light guide lens is uniformly illuminated.

In the side turn signal lamp 51 of FIG. 10 and JP 2006-114309, the majority of light radiated from the LED light source 54 passes through the light guide lens 53 in the longitudinal direction, and is emitted from the functional light distribution portion 56. Therefore, as shown in FIG. 11, a design light distribution portion 58 darkens between the functional light distribution portion 56 and a light source side light-emitting portion 57, worsening the appearance from the front of the vehicle. In the case of the side flash lamp described in US2006/193144, since light from the LED light source is almost uniformly distributed over the entire light guide lens, the design light distribution portion is bright. However, the amount of light guided to the functional light distribution portion accordingly decreases, such that the functional light distribution portion darkens, and in particular, visibility from the side of the vehicle worsens.

SUMMARY

It is an object of the present disclosure to provide a vehicular lamp that can distribute light from an LED light source in a balanced manner, illuminate a design light distribution portion with a small amount of light while achieving a good appearance, and brightly illuminate a functional light distribution portion with a sufficient amount of light.

In general, one aspect of the subject matter described in this specification can be embodied in a vehicular lamp, in which a light guide lens whose distal end curves toward the rear of the vehicle. An LED light source is mounted to a base end of the light guide lens, and a functional light distribution portion that diffuses light from the LED light source sideward of the vehicle is formed at the distal end of the light guide lens. The vehicular lamp is characterized by employing the following structure.

In some implementations, the vehicular lamp includes a design light distribution portion, which is provided in the light guide lens between the LED light source and the functional light distribution portion. A linear optical step is formed on the design light distribution portion so as to extend in a longitudinal direction of the light guide lens. A portion of light emitted from the LED light source toward the functional light distribution portion is reflected by the optical step in front of the vehicle.

In some implementations, the optical step is formed so as to project from a rear surface of the design light distribution portion.

In some implementations, a plurality of LED light sources is provided and aligned in a width direction of the light guide lens, in which the optical step is disposed between adjacent LED light sources, such that the optical step extends substantially parallel to main optical axes of the light sources.

In some implementations, a groove portion is formed at a plurality of locations on the optical step so as to traverse the step. In some cases, the groove portion is shallower than a height of the step.

In some implementations, an embossed portion is provided on a surface of the optical step.

In some implementations, the design light distribution portion is formed with the linear optical step. Therefore, it is possible, in some cases, to distribute light from the LED light source in a balanced manner to the design light distribution portion and the functional light distribution portion, linearly illuminate the design light distribution portion with a small amount of light, and improve the appearance from the front of the vehicle. In addition, it is possible to brightly illuminate the functional light distribution portion with a sufficient amount of light, and improve the visibility from the side of the vehicle.

In some implementations, the optical step projects from the rear surface of the design light distribution portion. Therefore, in a mold for forming the light guide lens, a portion for forming the optical step may be a recess groove so that damage to the step forming portion during mold maintenance can be prevented.

In some implementations, the optical step is disposed between the main optical axes of the plurality of LED light sources. As a result, an amount of light reflected by the optical step can be regulated and an amount of light for the functional light distribution portion can be accordingly increased. Thus, the overall light distribution can be optimized.

In some implementations, the groove portion is formed at a plurality of locations on the optical step in the transverse direction. Therefore, by combining a linear light emission formed by the optical step and point-like light emission formed by the groove portion, the external appearance of the design light distribution portion can be further improved.

In some implementations, the embossed portion is provided on the surface of the optical step. Therefore, it is possible to form a distinct linear light emission with a simple and clear appearance in the design light distribution portion, using diffused light reflected from the embossed portion.

Other features and advantages will be readily apparent from the following detailed description, the accompanying drawings, and the claims.

DETAILED DESCRIPTION

Figure 1:
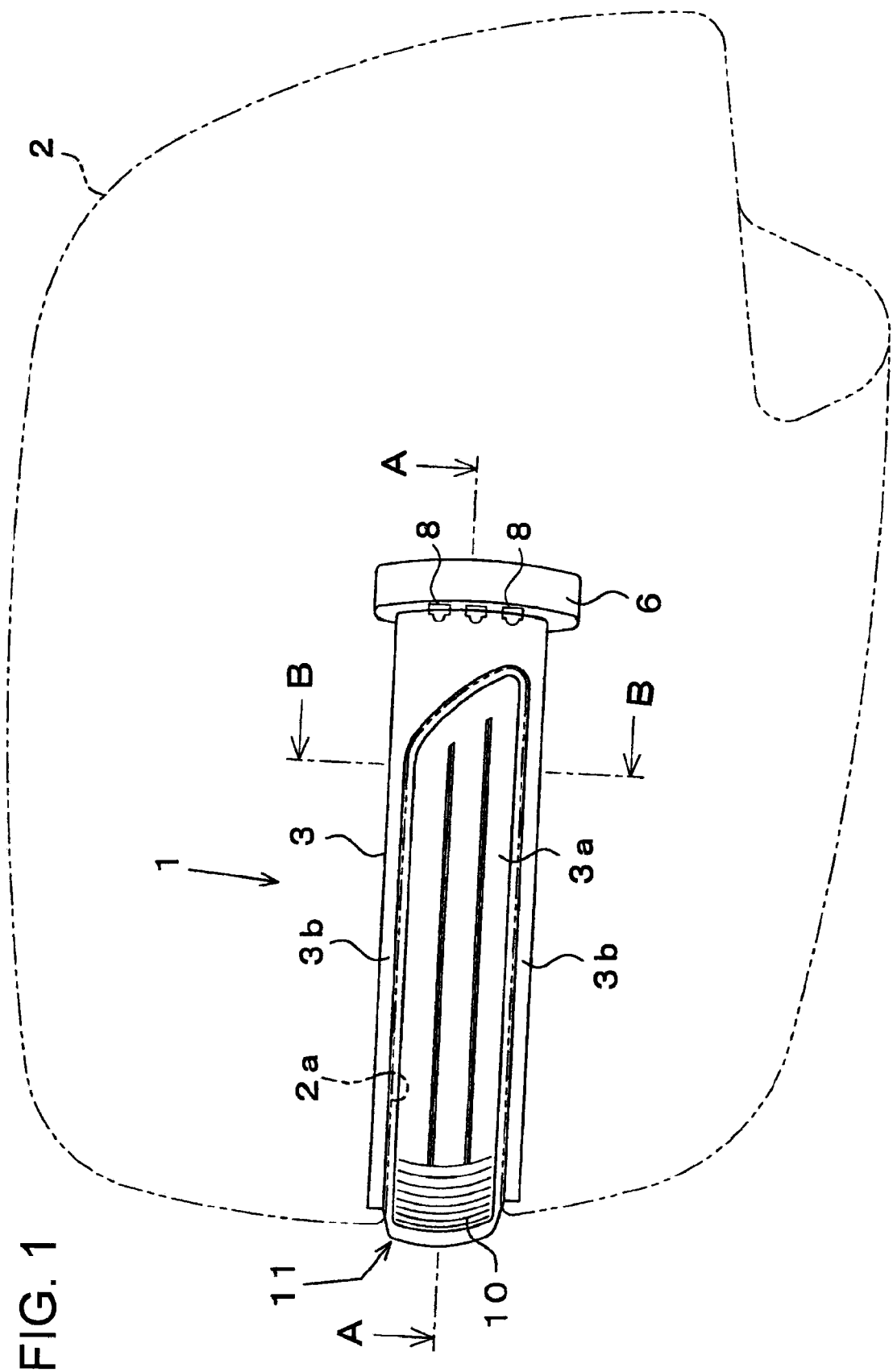
FIG. 1 shows a front view of an example of a side turn signal lamp.
Figure 2:
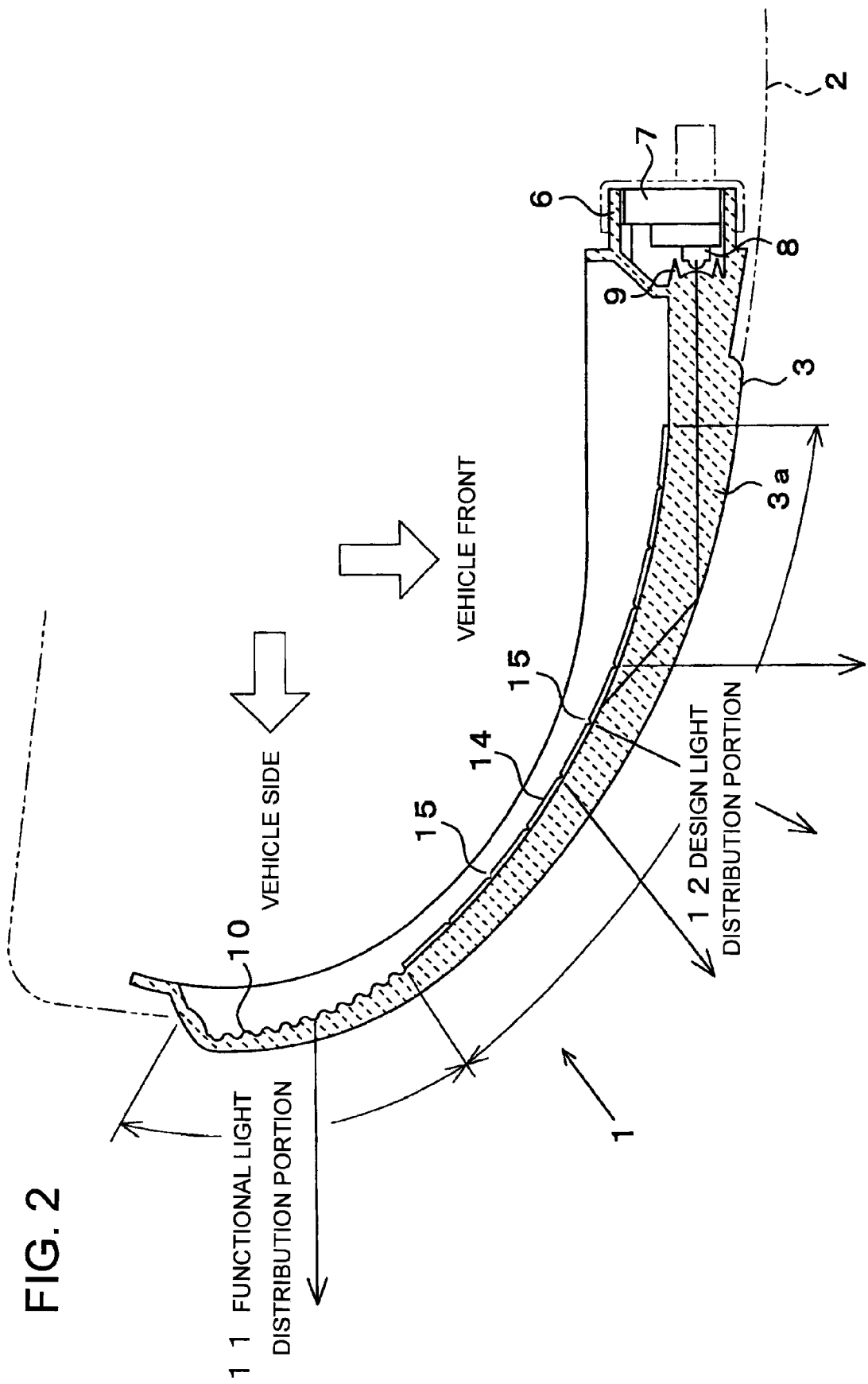
FIG. 2 shows a cross-sectional view taken along a line A-A in FIG. 1.
Figure 3:
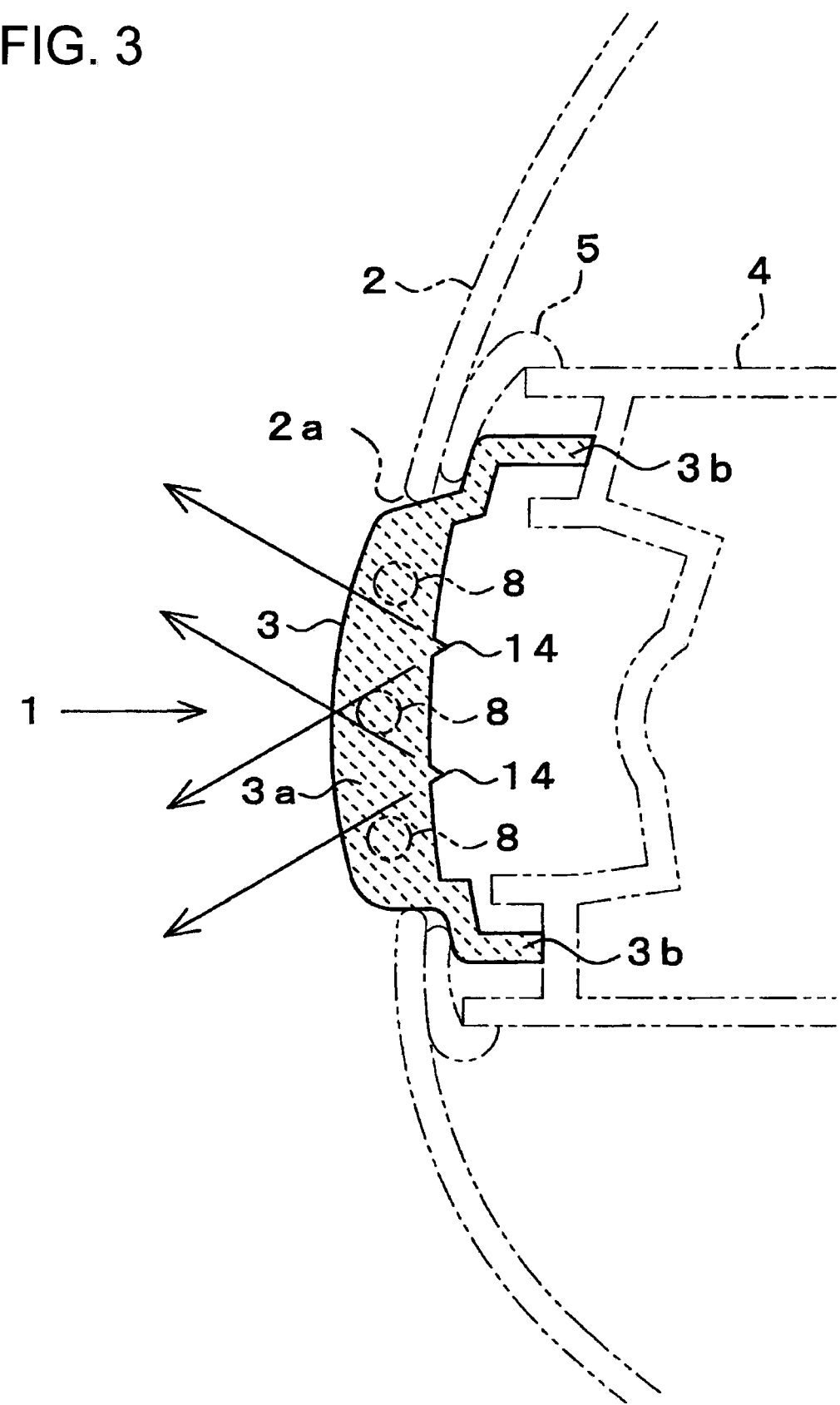
FIG. 3 shows a cross-sectional view taken along a line B-B in FIG. 1.

As illustrated in the examples of FIGS. 1 to 3, a side turn signal lamp 1 is provided with a light guide lens 3 on a front surface side of a mirror housing 2, similar to conventional side turn signal lamps. The light guide lens 3 includes a band-like lens portion 3a and a vertical pair of attachment portions 3b, and the entire light guide lens 3 is formed of a transparent synthetic resin material in a planar arc shape.

The attachment portions 3b are held by retainers 5 to an internal frame 4 of the mirror housing 2, and a front surface of the lens portion 3a is exposed from an opening portion 2a of the mirror housing 2 to the front and side of the vehicle. A ring-shaped wall 6 is formed at a base end of the lens portion 3a, and a light source unit 7 is mounted inside the ring-shaped wall 6. The light source unit 7 is provided with three LED light sources 8 aligned in a width direction of the light guide lens 3 (a vertical direction of the mirror housing 2) such that visible light is emitted from a socket 9 of the lens portion 3a toward a distal end of the light guide lens 3.

The distal end of the light guide lens 3 curves toward the rear of the vehicle, and an inner surface of a curved portion (a surface that faces the inside the mirror housing 2) of the lens portion 3a is formed with a plurality of light diffusion steps 10, thus constituting a functional light distribution portion 11 that diffuses light from the LED light sources 8 toward a side of the vehicle. In the light guide lens 3 of the present embodiment, a design light distribution portion 12 is set in a region between the LED light sources 8 and the functional light distribution portion 11. Two upper and lower optical steps 14 are formed on a rear surface (a surface that faces toward the rear of the vehicle) of the lens portion 3a in the design light distribution portion 12 so as to linearly extend in a longitudinal direction of the light guide lens 3.

Figure 4:
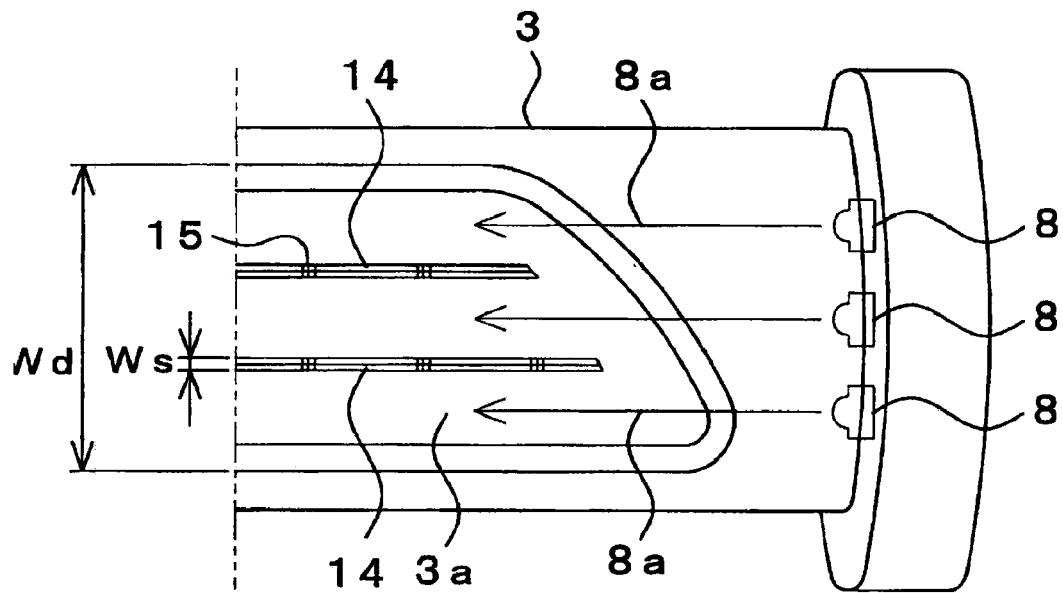
FIG. 4 shows a front view of an example of a base end portion of a light guide lens.
Figure 5:
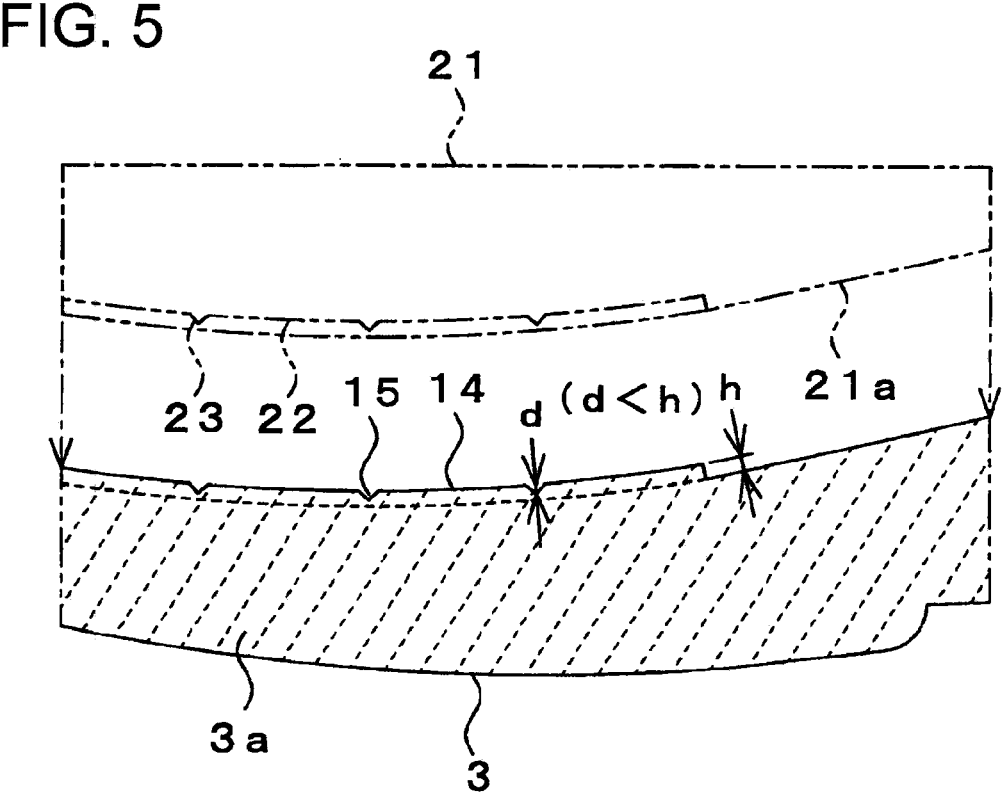
FIG. 5 shows a cross-sectional view of an example of a light guide lens.
Figure 6:
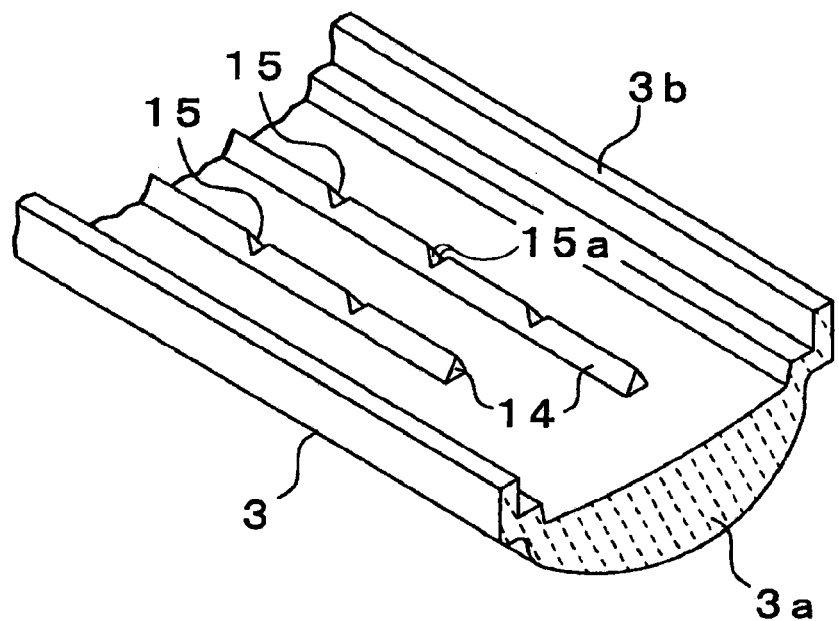
FIG. 6 shows a perspective view of an example of a base end portion of a light guide lens.

More specifically, the optical steps 14 have triangular cross sections and project from the rear surface of the lens portion 3a, as shown in FIG. 3. The optical steps 14 are each formed so as to extend between two adjacent LED light sources 8 parallel to main optical axes 8a thereof, as shown in FIG. 4. As shown in FIGS. 5 and 6, V-shaped groove portions 15 are formed by transversely notching each of the optical steps 14 at multiple locations in a longitudinal direction of the optical steps 14. Each groove portion 15 is provided with a pair of inclined reflection surfaces 15a facing each other in the longitudinal direction of the steps 14.

Figure 7:
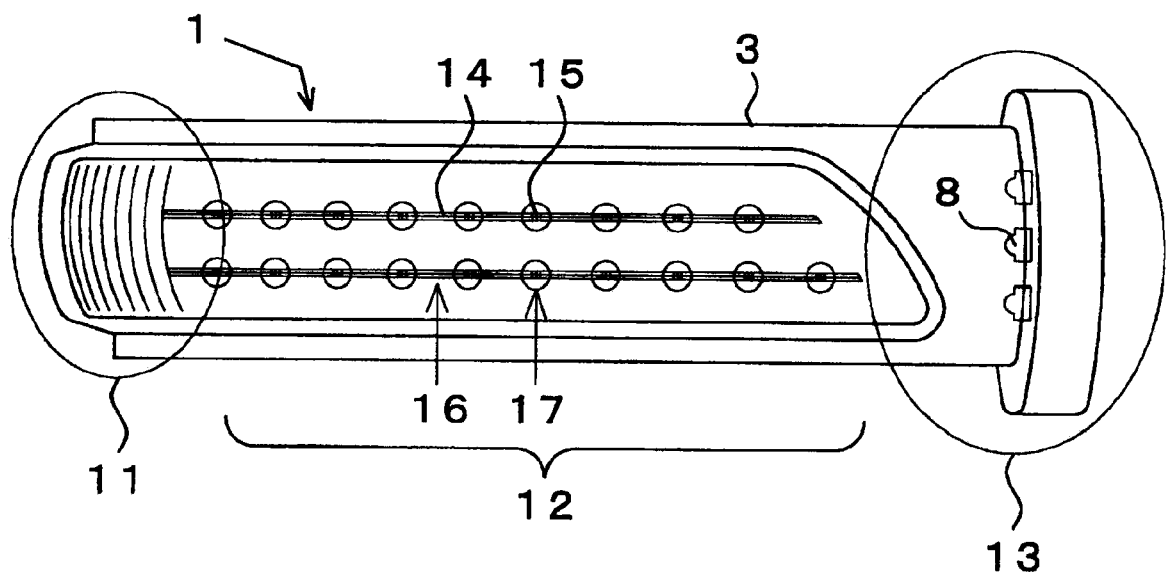
FIG. 7 shows a view of an external appearance of an example of a light guide lens and includes a light distribution pattern formed by steps of the light guide lens.

As shown in FIG. 7, when the LED light sources 8 are lit, a portion of light emitted from the LED light sources 8 toward the functional light distribution portion 11 is reflected by the optical steps 14a in front of the vehicle, such that two linear light-emitting portions (bright lines) 16 extend at a front surface of the design light distribution portion 12 between a light source side light-emitting portion 13 and the functional light distribution portion 11. Moreover, the groove portions 15 further diffuse a portion of such light to the surrounding areas, and add a plurality of point-like light-emitting portions 17 on the linear light-emitting portions 16.

Therefore, with the side turn signal lamp 1, it is possible to distribute light from the LED light sources 8 in a balanced manner to the design light distribution portion 12 and the functional light distribution portion 11, linearly illuminate the design light distribution portion 12 with a small amount of light while achieving a good appearance, and brightly illuminate the functional light distribution portion 11 with a sufficient amount of light. In particular, since the V-shaped groove portions 15 are arranged on the optical steps 14, the design light distribution portion 12 has both the linear light-emitting portions 16 and the point-like light-emitting portions 17. This enables the formation of a sophisticated light distribution pattern that accents a contrast between the linear light-emitting portions 16 and the point-like light-emitting portions 17.

Note that, in order to form a distinct light distribution pattern, it is preferable that a width (Ws in FIG. 4) of each optical step 14 is sufficiently narrow, for example, approximately 2 to 20% of a width (Wd) of the design light distribution portion 12. In addition, in order to facilitate maintenance of a lens mold 21 (see FIG. 5), it is preferable that a depth (d) of the groove portions 15 is shallower than a height (h) of the optical steps 14 (i.e., d<h).

That is, in the light guide lens 3 according to the present embodiment, the optical steps 14 project from the rear surface of the lens portion 3a. Therefore, recess grooves 22 for forming the optical steps 14 are provided on a molding surface 21a of the lens mold 21, and protrusions 23 for forming the groove portions 15 are provided on bottom surfaces of the recess grooves 22. Thus, by setting the depth (d) of the groove portions 15 to be shallower than the height (h) of the optical steps 14, both the recess grooves 22 and the protrusions 23 can be lower than the molding surface 21a.

Consequently, the risk of damaging the fine recess grooves 22 and the protrusions 23, during frequent sweeping operations of the molding surface 21a, is reduced. This facilitates maintenance of the lens mold 21 and can increase the mass-productivity of the light guide lens 3. Moreover, the optical steps 14 and the groove portions 15 are formed on the rear surface of the lens portion 3a. This makes it possible to provide the unlit design light distribution portion 12 with a feeling of depth and improve the appearance of the side turn signal lamp 1.

Figure 8:
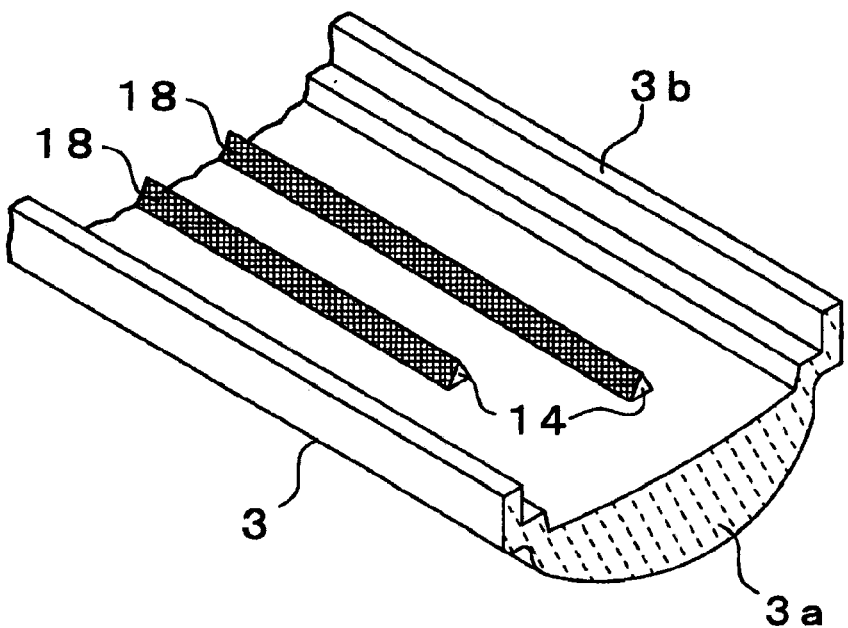
FIG. 8 shows a perspective view of an example of a base end portion of a light guide lens.
Figure 9:
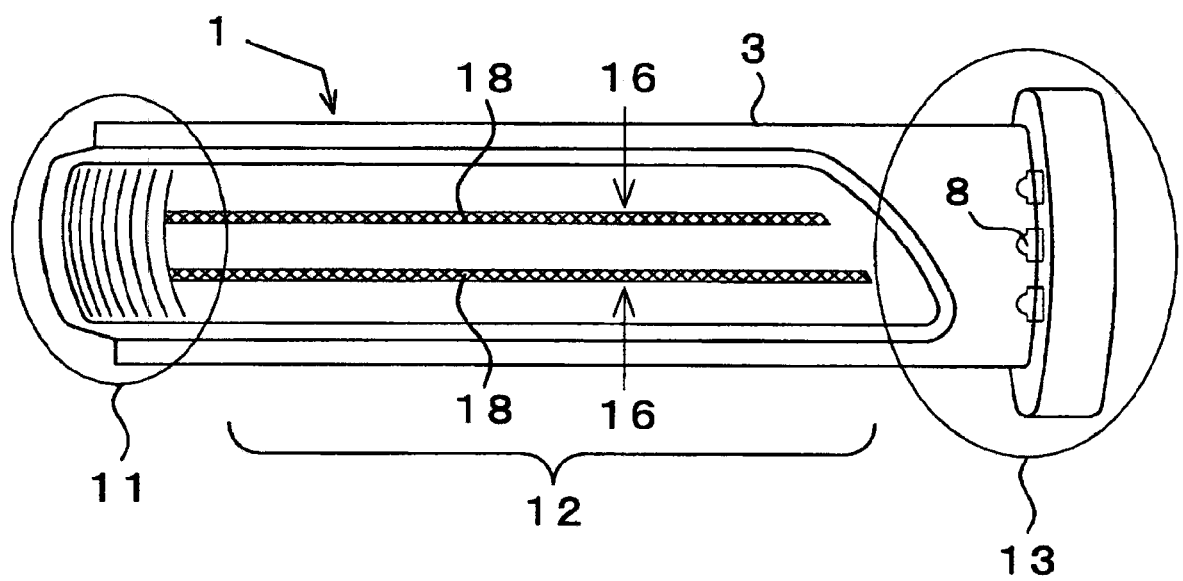
FIG. 9 shows a view of an external appearance of an example of a light guide lens and includes a light distribution pattern formed by steps of the light guide lens.
Figure 10:
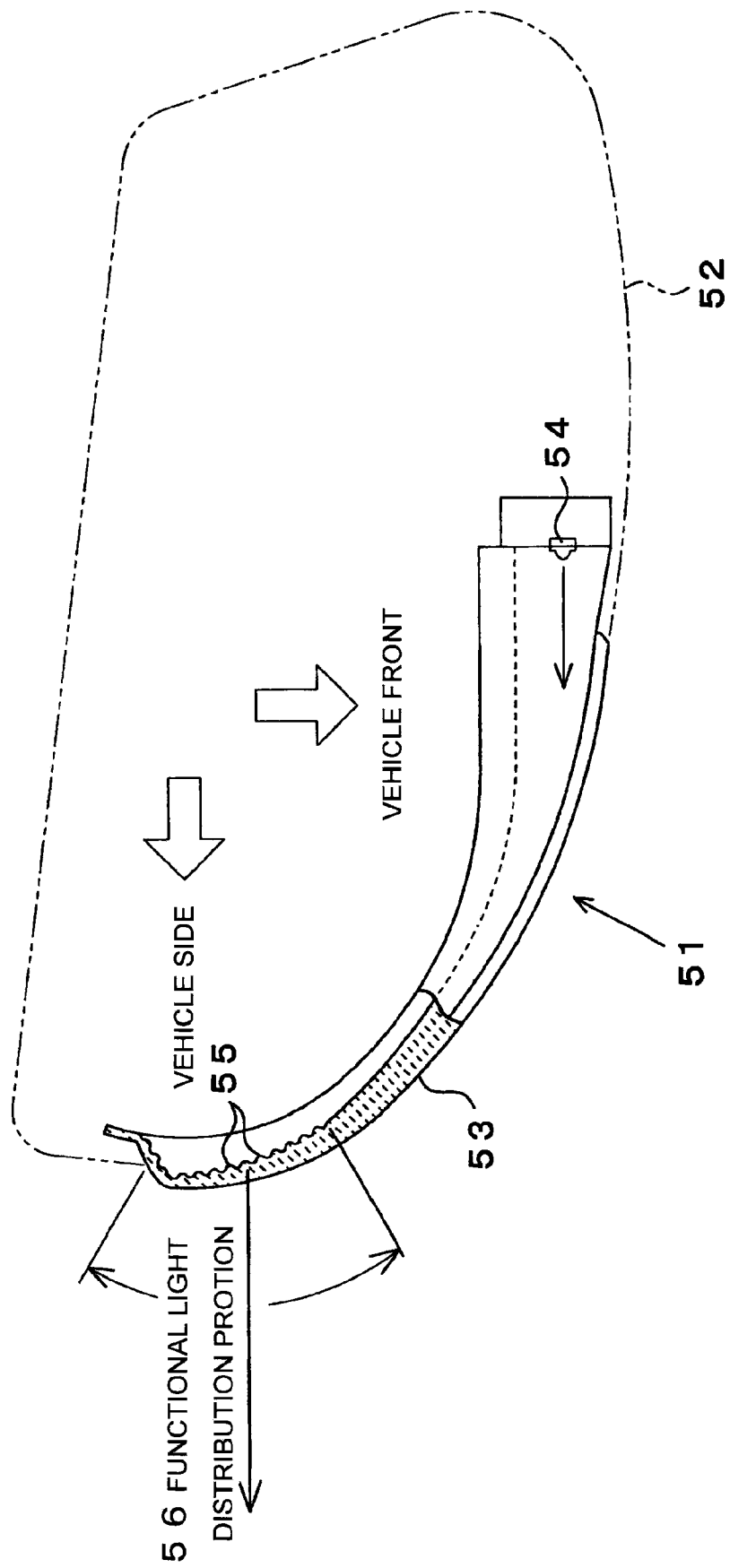
FIG. 10 shows a plan view of an example of a side turn signal lamp.
Figure 11:
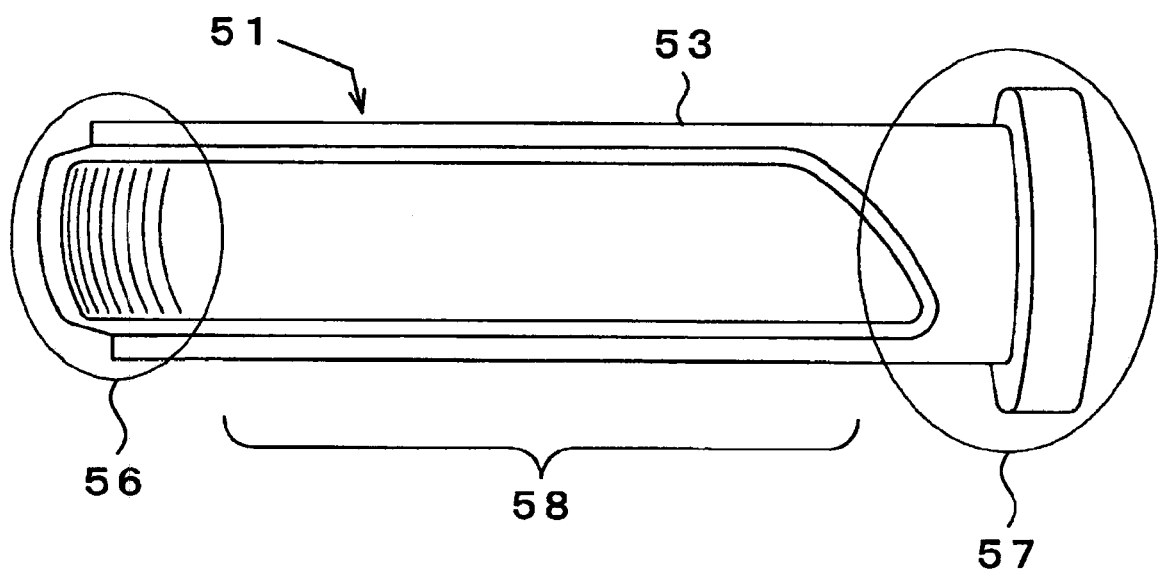
FIG. 11 shows a view of an external appearance of an example of a light guide lens, including a light-emitting portion of the lamp of FIG. 10.

In the light guide lens 3 shown in FIGS. 8 and 9, the groove portions 15 are omitted from the optical steps 14, and embossed portions 18 are provided on surfaces of the steps 14. The embossed portions 18 diffusedly reflect to a front of the vehicle, a portion of light that is emitted from the LED light sources 8 toward the functional light distribution portion 11, so as to form the linear light-emitting portions 16 in the design light distribution portion 12. Therefore, it is possible to form a distinct light distribution pattern with a simple, clear appearance and no halation between point-like light emissions. In addition, fine forming surfaces that correspond to the embossed portions 18 are lower than the molding surface 21a, as in the case of the lens mold 21 shown in FIG. 5, which enables easy maintenance of the mold.

Thus, particular embodiments of the invention have been described. The present invention is not limited to the above embodiments and other embodiments are within the scope of the following claims. For example, In some embodiments, semicircular or rectangular groove portions 15 may be formed in the optical steps 14. In certain embodiments, both the groove portions 15 and the embossed portion 18 may be provided in the optical steps 14. In some embodiments, the number of optical steps 14 may be appropriately increased or decreased, e.g., increased to 3 or decreased to 1. In certain embodiments, the light guide lens may be applied to lamps in different parts of the vehicle including, but not limited to, turn signal lamps, clearance lamps, marker lamps, and warning lamps.

What is claimed is:

1. A vehicular lamp comprising:
   a light guide lens having a distal end curving toward a rear of a vehicle;
   an LED light source mounted to a base end of the light guide lens;
   a functional light distribution portion configured to diffuse light from the LED light source sideward of the vehicle, wherein the functional light distribution portion is disposed at the distal end of the light guide lens;
   a design light distribution portion disposed in the light guide lens between the LED light source and the functional light distribution portion;
   a linear optical step on the design light distribution portion, the linear optical step extending in a longitudinal direction of the light guide lens, wherein the linear optical step is configured to reflect a portion of light emitted from the LED light source and in a direction of the functional light distribution portion to in front of the vehicle; and
   a plurality of groove portions disposed on the linear optical step so as to transverse the step, wherein the groove portion is shallower than a height of the step.

2. The vehicular lamp according to claim 1, wherein the linear optical step projects from a rear surface of the design light distribution portion.

3. The vehicular lamp according to claim 1, further comprising an embossed portion on a surface of the linear optical step.

4. The vehicular lamp of claim 1 wherein each of the groove portions has a pair of inclined reflection surfaces facing each other in the longitudinal direction.

5. The vehicular lamp of claim 1 wherein the groove portions are substantially V-shaped.

6. The vehicular lamp according to claim 1, wherein a plurality of LED light sources are aligned in a width direction of the light guide lens, and the linear optical step is disposed between adjacent LED light sources such that the linear optical step extends substantially parallel to main optical axes of the light sources.

7. The vehicular lamp according to claim 6, wherein the linear optical step projects from a rear surface of the design light distribution portion.

8. The vehicular lamp of claim 1 wherein the linear optical step projects from a rear surface of the design light distribution portion, and wherein a plurality of LED light sources are aligned in a width direction of the light guide lens, and the linear optical step is disposed between adjacent LED light sources such that the linear optical step extends substantially parallel to main optical axes of the light sources.

9. The vehicular lamp of claim 8 wherein each of the groove portions has a pair of inclined reflection surfaces facing each other in the longitudinal direction.

10. The vehicular lamp of claim 8 wherein the groove portions are substantially V-shaped.

11. The vehicular lamp of claim 10 wherein each of the groove portions has a pair of inclined reflection surfaces facing each other in the longitudinal direction.

* * * * *